United States Patent [19]

Tolles

[11] Patent Number: 4,801,311

[45] Date of Patent: Jan. 31, 1989

[54] METHOD AND APPARATUS FOR REMOVING HYDROGEN CYANIDE, CYANOGEN AND CYANOGEN CHLORIDE FROM AIR

[75] Inventor: Edward D. Tolles, Charleston, S.C.

[73] Assignee: Westvaco Corporation, New York, N.Y.

[21] Appl. No.: 713,287

[22] Filed: Mar. 18, 1985

[51] Int. Cl.$^4$ .............................................. B01D 53/04
[52] U.S. Cl. ............................................ 55/71; 55/68; 55/74; 55/387; 422/122; 422/177; 423/236; 423/240
[58] Field of Search .................. 55/68, 71, 74, 387; 422/122, 164, 177, 190, 191; 423/210, 236, 239, 240, 245, 462

[56] References Cited

U.S. PATENT DOCUMENTS

| 2,511,288 | 6/1950 | Morrell et al. | 502/417 |
| 2,818,323 | 12/1957 | Haensel | 55/74 X |
| 2,920,051 | 1/1960 | Wiig et al. | 55/74 X |
| 3,453,807 | 7/1969 | Taylor | 55/74 X |
| 3,618,295 | 11/1971 | Geiger et al. | 55/71 |
| 3,739,550 | 6/1973 | Martin et al. | 55/74 X |
| 4,040,802 | 8/1977 | Deitz et al. | 55/74 X |
| 4,111,833 | 9/1978 | Evans | 55/71 X |
| 4,204,980 | 5/1980 | Pasha et al. | 55/74 X |
| 4,212,852 | 7/1980 | Aibe et al. | 502/417 X |
| 4,293,317 | 10/1981 | Kovach | 55/71 |
| 4,531,953 | 7/1985 | Groose et al. | 55/74 |

FOREIGN PATENT DOCUMENTS 1575501  6/1969  France .............................. 502/417

Primary Examiner—Robert Spitzer
Attorney, Agent, or Firm—Terry B. McDaniel; Richard L. Schmalz

[57] ABSTRACT

A chromium free absorbent filter material and method for removing toxic gases such as cyanogen chloride, cyanogen and hydrogen cyanide is disclosed. The filter material is a whetlerite type activated carbon impregnated with copper, silver, and molybdenum and/or vanadium salts together with triethylenediamine and essentially retains the effectiveness of similar chromium containing whetlerites for protection without the carcinogenic hazard presented by chromium. The new material also releases substantially less ammonia odor compared to the conventional chromium bearing whetlerite.

19 Claims, No Drawings

METHOD AND APPARATUS FOR REMOVING HYDROGEN CYANIDE, CYANOGEN AND CYANOGEN CHLORIDE FROM AIR

BACKGROUND OF THE INVENTION

1. Field of the Invention

The Government has rights in this invention pursuant to Contract No. DAAK11-82-C-0085 awarded by the Department of the Army.

2. Description of the Prior Art

The present invention relates generally to a method and apparatus (individual and collective protection filters) for removal of toxic gases. More particularly, the present invention is directed to an activated charcoal or carbon filter which is especially effective in removing hydrogen cyanide and cyanogen chloride from the air.

The use of activated carbon or charcoal which has been impregnated with metals and metal compounds as a filter to remove toxic gases has long been known. During both World Wars I and II, gas masks containing activated charcoal impregnated with copper and copper oxides was used to remove hydrogen cyanide. During World War II, combinations of copper, silver and chromium were employed with activated charcoal to remove such toxic agents as hydrogen cyanide, cyanogen chloride, and arsine. The copper impregnated charcoal was called whetlerite, after C. Whetzel who was instrumental in its development.

Military air filters have employed activated carbon impregnated with various compounds which are effective in removing specific toxic gases not readily controlled by carbon alone. In this country, a chromium catalyst, formed in situ on the carbon has been effectively used against the vapor cyanogen chloride. Use of this catalyst has, however, led to a number of problems.

1. The catalyst looses effectiveness when "aged" under certain conditions of humidity and temperature.
2. Conditions required to form the catalyst including carbon type and processing methods are critical and may be hard to achieve.
3. Processing conditions do not allow complete removal of ammonia from the product, leading to the release of irritating odors.
4. Chromium is carcinogenic and a potential hazard if carbon dust is inhaled.

Over the years a number of modified compositions have been tried which tend to improve the aging characteristic of the filter with respect to cyanogen chloride removal. These have been based on addition of organic amines to the chromium impregnated product. While a number of different types of amine compounds have been tested, the most effective has been triethylenediamine (TEDA). In the last 10 years the British Military has employed TEDA in combination with chromium salts to augment cyanogen chloride removal by their gas masks.

A search of the prior art has uncovered patents which discloses a variety of agents for enhancing the effectiveness of activated carbon for the selective sorption of gases.

U.S. Pat. No. 4,212,852 to Aibe et al discloses a method for using activated carbon having supported thereon a metal compound of vanadium, molybdenum or tungsten to deodorize gases containing ammonia, amides and/or hydrogen sulfide.

U.S. Pat. No. 4,111,833 to Evans discloses activated charcoal impregnated with triethylenediamine and a mixture of iodine and potassium to remove iodine from a nuclear reactor effluent stream.

U.S. Pat. No. 4,040,802 to Deitz et al discloses activated charcoal impregnated with a tertiary amine, such as triethylenediamine and iodine or bromine to remove methyl iodine from a nuclear reactor effluent stream.

U.S. Pat. No. 3,739,550 to Martin et al discloses activated carbon impregnated with a mixed catalyst which includes a vanadium compound and at least one compound of potassium, lithium or barium to desulfurize carbon dioxide containing waste gases.

British Pat. No. 1,123,822 discloses activated charcoal impregnated with piperazine or triethylenediamine to remove iodine from nuclear waste effluent.

U.S. Pat. No. 3,355,317 to Keith et al discloses the use of the oxides of cobalt, copper, zinc, iron and molybdenum on activated carbon to remove hydrogen cyanide from tobacco smoke.

U.S. Pat. No. 2,920,050 and U.S. Pat. No. 2,920,051, both to Blacet et al describe the preparation of whetlerite type filters which include copper, chromium, silver and molybdenum impregnants.

In addition to the foregoing prior art patents, the comprehensive 1946 Government study entitled "Military Problems With Aerosols and Nonpersistent Gases", Volume I, sponsored by the Office of Scientific Research and Development (OSRD), decribes the use of activated charcoal impregnated with various agents for removing noxious gases. Such uses are principally for gas masks devices.

Grabenstetter and Blacet authored Chapter 4 ("Impregnation of Charcoal") of the 1946 OSRD report describing the use of copper, silver, chromium and molybdenum or vanadium impregnants on activated carbon to remove hydrogen cyanide and cyanogen chloride, both with and without tartaric acid. Numerous organic base impregnations of charcoal are disclosed, including amines, such as, diethylene triamine and others.

SUMMARY OF THE INVENTION

The present invention is particularly directed to the use of a whetlerite type sorbent which avoids the use of carcinogenic components, such as, chromium. Activated carbon that has been impregnated with copper, silver, molybdenum and/or vanadium, and triethylenediamine has been found to be particularly effective for gas masks for removing hydrogen cyanide and cyanogen chloride, and without the need for chromium. Optionally, tartaric acid can be added.

The following conventional designations are employed herein to describe the various types of impregnated activated charcoal (or carbon) used in connection with the present invention:

| Whetlerite Type | Constituents |
|---|---|
| ASV | activated charcoal with copper, silver, vanadium |
| ASM | activated charcoal with copper, silver, molybdenum |
| ASVT | activated charcoal with copper, silver, vanadium and tartaric acid |
| ASMT | activated charcoal with copper, silver, |

| Whetlerite Type | Constituents |
| --- | --- |
| ASMVT | molybdenum and tartaric acid activated charcoal with copper, silver, molybdenum, vanadium and tartaric acid |

Another aspect of the present invention is a method for removing hydrogen cyanide and cyanogen chloride from air or other gases using a whetlerite type filter material of the type shown above that has been impregnated with from about 1.0 to about 7.5% by weight triethylenediamine (TEDA). Experiments have been performed to determine suitable impregnation methods and loading levels of TEDA as a replacement for chromium. Loadings of 4-6% TEDA (by weight) have been shown to yield a filter which meets U.S. Military specifications for cyanogen chloride removal, even when compared against the conventional chromium impregnated carbon (type ASC). Performance of the TEDA impregnated filter after "aging" far exceeds that of chromium based material.

The respective amount of these components present in the impregnated carbon is typically as follows:

Copper: 5 to 20 weight percent, preferably 7 to 15%, for example, added as copper carbonate;

Silver: up to 0.5 weight percent, preferably 0.03 to 0.1%, added for example as silver nitrate;

Triethylenediamine: 1.0 to 7.5 weight percent, preferably 2 to 6%.

Molybdenum, added as ammonium molybdate, and/or vanadium, added as ammonium vanadate: 1.0 to 10 weight percent, preferably 2 to 4 weight percent, either total or individually;

Tartaric acid: up to about 8 weight percent.

In this formulation the silver is not essential for removing hydrogen cyanide and cyanogen chloride but is used to protect against another toxic agent, arsine.

The precursor filter material used in the present invention can be conventionally prepared in accordance with the procedures described by the two Blacet et al patents (U.S. Pat. Nos. 2,920,050 and 2,920,051). Thus, activated carbon particles are impregnated with solutions of the respective salts of copper, vanadium and/or molybdenum, and silver, followed by drying. Typical procedures and formulations for copper and silver impregnations are also described by Grabenstetter and Blacet in the 1946 OSRD report, op.cit., incorporated herein by reference. Drying of the initially impregnated carbon can be carried out in a fluidized bed, oven, or air (or inert gas, such as flue gas) stream at temperatures of about 200° to 600° F. preferably about 350° to 450° F. It is also desirable first to dry the initially impregnated carbon at a lower temperature (225° F.-275° F.) followed by heat treatment at a higher range (350° F. to 600° F.). Thereafter, impregnation with TEDA can be carried out by applying an aqueous solution of the amine, by spraying or wetting, onto the metal impregnated carbon, followed by drying at about 150° F.-300° F., preferably 180° F. to 220° F.

DESCRIPTION OF THE PREFERRED EMBODIMENTS

The following description and examples provide details of the manner in which the embodiments of the present invention can be made and used to effectively remove cyanogen chloride, hydrogen cyanide and cyanogen from air without the presence of chromium.

The examples shown are based on actual experimental work. While exemplary of the present invention, the examples should not be construed as specifically limiting the invention and such variations which would be within the purview of one skilled in the art are to be considered to fall within the scope of the invention.

PREPARATION OF IMGREGNATED SAMPLES

Activated carbon was impregnated with copper in combination with molybdenum and/or vanadium according to the formulae reported by Grabenstetter and Blacet, op.cit., as shown in TABLE 1.

TABLE 1

Concentrations of Constituents in Type ASMT or ASVT Impregnating Solution

| Constituent | Amount | % By Weight of Constituent |
| --- | --- | --- |
| $(NH_4)_2MoO_4$ | 209 gm | 3.9% Mo |
| $NH_4VO_3$ | 185 gm | 2.9% V |
| $CuCO_3.Cu(OH)_2$ | 574 gm | 9.7% Cu |
| $(NH_4)_2CO_3.H_2O$ | 306 gm | 8.8% $CO_2$ |
| Tartaric Acid | 180 gm | 6.2% $C_4H_6O_6$ |
| $AgNO_3$ | 0.45 gm | 0.04% Ag |
| $NH_4OH$ (28% Soln.) | 720 ml | 10% $NH_3$ |
| Water | To make 2.25 l | |

EXAMPLE 1

2.25 liters of the impregnant solution shown in TABLE 1 were used to treat 750 gm of carbon. Two groups were prepared (Sample Sets I, II). For each sample set, the carbon was soaked in an appropriate amount of solution, drained, and dried in an oven at 220° F. Samples 83-135 to 83-138 in Set I were heat treated in a fluidized bed at 375° F. and 575° F. in an atmosphere of simulated flue gas. Samples 83-151 to 83-154 in Set II were prepared as type ASVT (including vandadium with tartaric acid). Samples were also prepared with vanadium and molybdenum but without the tartaric acid additive. After drying, the products were heat treated in a fluid bed at 400° F., in simulated flue gas, for 10 minutes. Half of these products received an additional fluid bed treatment in air at 260°-270° F. Samples made with and without air treatment were also impregnated with 6% triethylenediamine (TEDA). Air treatment was done as a supplemental operation at relatively low temperatures because the molybdenum and vanadium impregnated carbons were found to be susceptible to ignition during principal heat treatment.

Tube life results measured for hydrogen cyanide are shown in TABLE 2 for the members of sample Sets I and II. The addition of molybdenum and vanadium appeared to supplement the action of copper, and the performance of the products was significantly improved over that of activated carbon impregnated with copper and silver alone (type AS) and compared favorably with chromium impregnated carbon (type ASC). Type AS carbon has an average life of 13-14 minutes compared with 30 minutes, for type ASC impregnates.

For type AS carbon it has also been found that some hydrogen cyanide is converted into the toxic gas cyanogen which escapes capture. Cyanogen is not readily detected by the standard hydrogen cyanide test using a sodium bicarbonate absorbent and iodine indicator. However addition of chromium prevents escape of cyanogen (Grabenstetter and Blacet, op.cit.,). It is reported that molybdenum and vanadium also prevent escape of cyanogen when in combination with copper.

This was tested for the current experimental products using samples inpregnated with vanadium. A special test using sodium hydroxide absorbent and chloramine-T indicator, which is sensitive to both hydrogen cyanide and cyanogen, showed no evidence of cyanogen escape. The new formulations therefore protect against premature breakthrough of cyanogen under challenge with hydrogen cyanide. It may also be inferred that these filter materials will protect against cyanogen when challenged with that gas.

samples had been treated at 85% relative humidity at 113° F. for 168 hours.

TABLE 2

Hydrogen Cyanide Life of Chromium Free Whetlerites Containing Vanadium and Molybdenum

| Sample No. 83-( ) | Sample Set | Product Type | Temp °F. Treatment | Air Treatment | TEDA Treatment | HCN Life Original | (Min) Aged |
|---|---|---|---|---|---|---|---|
| 142 | II | ASV | 400 | — | — | 23.8 | 16.1 |
| 144 | | ASV | 400 | A | — | 25.9 | 21.5 |
| 145 | | ASV | 400 | A | T | 25.3 | 21.7 |
| 143 | | ASV | 400 | — | T | 22.2 | 18.7 |
| 151 | | ASVT | 400 | — | — | 23.8 | 21.2 |
| 153 | | ASVT | 400 | A | — | 21.3 | 19.3 |
| 154 | | ASVT | 400 | A | T | 29.8 | 19.9 |
| 152 | | ASVT | 400 | — | T | 29.8 | 23.4 |
| 136 | I | ASVT | 375 | — | — | 27.8 | 22.5 |
| 135 | | ASVT | 575 | — | — | 29.9 | 26.5 |
| — | | ASVT | 375 | A | — | 34.9 | 23.7 |
| — | | ASVT | 575 | A | — | 34.5 | 30.9 |
| 146 | II | ASM | 400 | — | — | 17.6 | 18.3 |
| 148 | | ASM | 400 | A | — | 20.0 | 18.6 |
| 149 | | ASM | 400 | A | T | 20.1 | 20.1 |
| 147 | | ASM | 400 | — | T | 19.3 | 23.7 |
| 138 | I | ASMT | 375 | — | — | 24.2 | 32.5 |
| 137 | | ASMT | 575 | — | — | 22.5 | 34.1 |
| 140 | | ASMVT | 375 | — | — | 25.1 | 31.6 |
| 139 | | ASMVT | 575 | — | — | 24.0 | 30.5 |

For unaged products, those made with vanadium (ASV) were consistently better than the ones using molybdenum (ASM), some of which would appear to meet the hydrogen cyanide specification life of 25 minutes. The average life of all products made without vanadium was 21 minutes while that for products containing only vanadium was 27 minutes.

The aged products which contain molybdenum gave hydrogen cyanide life results of over 30 minutes, a substantial improvement over the unaged analogs. These

EXAMPLE 2

Similar tests for cyanogen chloride life effectiveness are shown in TABLE 3. Products containing TEDA demonstrated useful protective life. The products made with vanadium and 6% TEDA gave tube life results in the 45-60 minute range. This compares with the specification minimum of 40 minutes (in canister tests).

TABLE 3

Cyanogen Chloride Life of Chromium Free Whetlerites Containing Vanadium and Molybdenum

| Sample No. 83-( ) | Sample Set | Product Type | Temp °F. Treatment | Air Treatment | TEDA Treatment | HCN Life Original | (Min) Aged |
|---|---|---|---|---|---|---|---|
| 142 | II | ASV | 400 | — | — | 2.7 | 2.1 |
| 144 | | ASV | 400 | A | — | 1.7 | 1.8 |
| 145 | | ASV | 400 | A | T | 48.9 ± 4.1 | 60.8 ± 7.2 |
| 143 | | ASV | 400 | — | T | 46.1 ± 2.0 | 54.9 ± 7.8 |
| 151 | | ASVT | 400 | — | — | 2.6 | 1.2 |
| 153 | | ASVT | 400 | A | — | 2.2 | 1.4 |
| 154 | | ASVT | 400 | A | T | 62.5 ± 7.6 | 55.8 ± 3.7 |
| 152 | | ASVT | 400 | — | T | 53.7 ± 12.1 | 48.5 ± 4.1 |
| 136 | I | ASVT | 375 | — | — | 2.1 | 1.2 |
| 135 | | ASVT | 575 | — | — | 2.7 | 1.9 |
| — | | ASVT | 375 | A | — | — | — |
| — | | ASVT | 575 | A | — | — | — |
| 146 | II | ASM | 400 | — | — | 2.7 | 1.9 |
| 148 | | ASM | 400 | A | — | 3.6 | 1.7 |
| 149 | | ASM | 400 | A | T | 34.2 ± 0.9 | 28.8 ± 2.4 |
| 147 | | ASM | 400 | — | T | 32.2 ± 2.4 | 32.5 ± 2.0 |
| 138 | I | ASMT | 375 | — | — | 8.8 | 3.1 |
| 137 | | ASMT | 575 | — | — | 15.9 | 5.4 |
| 140 | | ASMVT | 375 | — | — | 8.0 | 3.0 |
| 139 | | ASMVT | 575 | — | — | 15.4 | 6.4 |

EXAMPLE 3

Ammonia desorption test results for the vanadium and molybdenum products from Sample Set II are shown in TABLE 4. The ASV and ASM carbons without TEDA released about 0.3-0.4 µg $NH_3$/1/100 cc C. This is about ⅓ of the desorption for experimental ASC carbons made under similar conditions. Addition of 6% TEDA raised the apparent ammonia desorption of the new products, but it is still below the level typical of commercial type ASC products (about 2 μg NH₃/1/100 cc C).

ucts containing 2%, 4%, and 6% TEDA. These products were dried at 220° F. in an oven and the results on hydrogen cyanide tube life are shown in TABLE 5.

TABLE 5

Effect of Whetlerite Preparation and TEDA on Hydrogen Cyanide and Cyanogen Chloride of Type ASVT Whetlerites

| No. 83-( ) | ASVT Prep. Contact Method | % TEDA | HCN Tube Life (Min) | Cyanogen Chloride Original Tube Life (Min) | Cyanogen Chloride Original Std. Dev. (Min) | Cyanogen Chloride Aged Tube Life (Min) | Cyanogen Chloride Aged Std. Dev. (Min) |
|---|---|---|---|---|---|---|---|
| 198 | Sorption | 0 | — | 2.4 | 0.1 | — | — |
| 199 | | 2.0 | 25.6 | 27.6 | 4.9 | 29.6 | 4.6 |
| 200 | | 4.0 | 24.7 | 40.3 | 3.2 | 41.6 | 2.3 |
| 201 | | 6.0 | 28.6 | 47.2 | 1.9 | 44.8 | 6.8 |
| 203 | Addition | 0 | — | 1.8 | 0.2 | 0 | — |
| 204 | | 2.0 | 22.7 | 39.1 | 2.1 | 33.2 | 3.5 |
| 205 | | 4.0 | 18.3 | 40.7 | 2.8 | 38.9 | 4.2 |
| 106 | | 6.0 | 20.8 | 42.6 | 3.0 | 42.8 | 3.6 |

Ammonium Desorption Tests for Whetlerties Containing Molybdenum and Vanadium

| Sample No. 83-( ) | Product Type | Supplemental Treatment | Ammonia μg/1/100 cc C |
|---|---|---|---|
| 142 | ASV | — | 0.38 |
| 144 | ASV | Air | 0.38 |
| 145 | ASV | Air/TEDA | 0.88 |
| 143 | ASV | TEDA | 0.82 |
| 151 | ASVT | — | 0.36 |
| 153 | ASVT | Air | 0.33 |
| 154 | ASVT | Air/TEDA | 1.53 |
| 152 | ASVT | TED | 1.40 |
| 146 | ASM | — | 0.42 |
| 148 | ASM | Air | 0.26 |
| 149 | ASM | Air/TEDA | 0.44 |
| 147 | ASM | TEDA | 0.75 |

SUMMARY OF RESULTS FOR SAMPLE SETS I AND II

Based on test results for these samples, chromium free whetlerites can be made which meet hydrogen cyanide and cyanogen chloride specifications, show little or no detrimental effect of aging on cyanogen chloride life, and desorb less than half the amount of ammonia typically produced by conventional type ASC whetlerite.

EXAMPLE 4

Additional type ASVT carbons (Sample Set III) were prepared from activated carbon using the sorption contacting method ("dip-and-drain") as employed previously. Additional products were made using the addition ("spray-on") contacting method. For the latter, the impregnant solution formula was the same as that used for soaking, except that the amount of silver was increased to 0.000402 gm Ag/ml solution from the concentration of 0.000127 gm Ag/ml used in sorption. In the addition method, the solution was added as a spray to just wet the carbon without yielding any excess solution which could be drained. In the sorption method, three times this amount of solution was used in contacting. The solution loading on carbon was 1.0 ml/gm carbon for the addition method, a litter less than for sorption.

The impregnated products were heat treated in a fluidized bed at 450° F. and subsequently impregnated with TEDA by spraying with 20 ml of an aqueous TEDA solution per 100 gm activated carbon. The solutions contained sufficient TEDA to yield ASVT prod-

SUMMARY OF RESULTS OF SAMPLE SET III

The results indicate that contacting by sorption gave much better hydrogen cyanide life performance. It is likely that product which was soaked contains a little more (probably less than 10% more) metal. However, additional prior testing of standard ASC whetlerites showed no difference between these contacting methods. Nor were there any significant effects observed on the hydrogen cyanide life as a function of TEDA loadings.

It is believed that the improved cyanogen chloride activity is due to the presence of TEDA, and that cyanogen chloride life increases with TEDA loading. A loading of 6% TEDA gave a tube test life greater than 40 minutes for these samples. As a practical matter, however, a loading on the order of 4% may be sufficient to give satisfactory performance in canister life tests, especially since this product does not undergo aging as with type ASC whetlerite. The optimum TEDA loading will be that which gives good cyanogen chloride activity without interfering with sorption of other gases.

EXAMPLE 5

In order to test vanadium (ASVT) and molybdenum (ASTM) impregnated material, the activated carbon precursor was impregnated with silver, copper and vanadium or molybdenum by soaking. These products were dried at 220° F., and then heat treated at 450° F. in an atmosphere of steam and flue gas using a fluidized bed reactor. TEDA was applied by spraying on an aqueous solution to provide a 6% loading. For each whetlerite type, product from several individual runs was composited to make 5 pound demonstration samples.

The ammonia desorption results in TABLE 6 correspond to a test interval of 2 hours, which was run without any evidence of a colorimetric end-point. Previous tests have shown that valid end-points can be obtained for long test intervals using this method.

TABLE 6

HCN Tube Life and Ammonia Desorption

| Sample No. 84-( ) | Product | Run No. | HCN Life (Min) | Ammonia Desorption μl/100 ml C Less Than: |
|---|---|---|---|---|
|  | ASVT | 1 | 39.8 | 0.24 |
| 049 |  | 2 | 30.6 | 0.24 |
| 053 |  | 3 | 37.5 | 0.24 |
| 051 |  | 4 | 32.2 | 0.24 |
| 052 | ASMT | 1A | 25.7 | 0.33 |
| 050 |  | 2A | 26.2 | 0.33 |
| — |  | 1B | 28.6 | 0.33 |
| — |  | 2B | 27.6 | 0.33 |
| — |  | 3 | 25.8 | 0.33 |

It has now been found that molybdenum and vanadium are alternatives to chromium, which offer similar catalytic properties with respect to HCN removal when used in combination with copper. These metals are reported to prevent breakthrough of cyanogen gas, and are not considered carcinogenic. Thus, a chromium-free product, about equivalent to conventional type ASC whetlerite in HCN protection, but improved in cyanogen chloride after aging can be made by impregnation of carbon with copper, silver, molydenum and/or vanadium and TEDA. Prepared under the conditions illustrated, these products also release only 10–50% of the ammonia odor typical of type ASC whetlerite according to the standard test.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An improved method for removing toxic gases selected from the group consisting of the mixture of hydrogen cyanide and cyanogen chloride, the mixture of cyanogen and cyanogen chloride, the mixture of hydrogen cyanide, cyanogen and cyanogen chloride, and cyanogen chloride from an air stream containing said toxic gases using type ASM whetlerite carbons, wherein the improvement comprises utilizing said carbon having an amount of triethylenediamine added thereto effective for the removal of cyanogen chloride.

2. The improved method of claim 1 wherein said triethylenediamine is present in an amount ranging from about 1.0 to about 7.5 weight %.

3. The improved method of claim 1 wherein said triethylenediamine is present in an amount ranging from about 4 to about 6 weight %.

4. An improved method for removing toxic gases selected from the group consisting of the mixture of hydrogen cyanide and cyanogen chloride, the mixture of cyanogen and cyanogen chloride, the mixture of hydrogen cyanide, cyanogen and cyanogen chloride, and cyanogen chloride from an air stream containing said toxic gases using type ASV whetlerite carbons, wherein the improvement comprises utilizing said carbon having an amount of triethylenediamine added thereto effective for the removal of cyanogen chloride.

5. The improved method of claim 4 wherein said triethylenediamine is present in an amount ranging from about 1.0 to about 7.5 weight %.

6. The improved method of claim 4 wherein said triethylenediamine is present in an amount ranging from about 4 to about 6 weight %.

7. Filter for removing toxic gases from an air stream comprising chromium-free carbon particles impregnated with copper, triethylenediamine and one or more components selected from the group consisting of molybdenum and vanadium.

8. The filter of claim 7 wherein the carbon particles are additionally impregnated with silver.

9. The filter of claim 8 wherein the silver content is up to 0.5 weight percent.

10. The filter of claim 7 wherein the toxic gases removed are one or more of cyanogen chloride, cyanogen and hydrogen cyanide.

11. The filter of claim 10 wherein the molybdenum and/or vanadium content ranges from about 1 to about 10 weight percent, individually.

12. The filter of claim 7 wherein the copper content is from about 5 to about 20 weight percent.

13. The filter of claim 7 wherein the triethylenediamine content is from about 1.0 to about 7.5 weight percent.

14. The filter of claim 7 or 8 having the following composition:
copper: from about 5 to about 20 weight %
silver: up to 0.5 weight %
molybdenum: from about 1 to about 10 weight %
triethylenediamine: from about 1.0 to about 7.5 weight %
carbon: balance.

15. The filter of claim 14 having the following composition:
copper: 5 to 20 weight %
silver: up to 0.5 weight %
molybdenum: 1 to 10 weight %
triethylenediamine: 4 to 6 weight %
carbon: balance.

16. The filter of claim 7 or 8 having the following composition:
copper: from about 5 to about 20 weight %
silver: up to about 0.5 weight %
vanadium: from about 1 to about 10 weight %
triethylenediamine: from about 1.5 to about 7.5 weight %.
carbon: balance.

17. The filter of claim 16 having the following composition:
copper: 5 to 20 weight %
silver: up to 0.5 weight %
vanadium: 1 to 10 weight %
triethylenediamine: 4 to 6 weight %
carbon: balance.

18. Type ASV whetlerite charcoal further including triethylenediamine in an amount effective for removing cyanogen chloride.

19. Type ASM whetlerite charcoal further including triethylenediamine in an amount effective for removing cyanogen chloride.

* * * * *

UNITED STATES PATENT AND TRADEMARK OFFICE
CERTIFICATE OF CORRECTION

PATENT NO. : 4,801,311
DATED : January 31, 1989
INVENTOR(S) : Edward D. Tolles

It is certified that error appears in the above-indentified patent and that said Letters Patent is hereby corrected as shown below:

In column 1, line 63, delete "discloses" and substitute therefor --disclose--.

In column 4, line 7, delete "IMGREGNATED" and substitute therefor --IMPREGNATED--.

In column 4, line 38, delete "vandadium" and substitute therefor --vanadium--.

In column 5, line 2, delete "inpregnated" and substitute therefor --impregnated--.

In column 7, line 62, delete "litter" and substitute therefor --little--.

In column 8, line 54, delete "(ASTM)" and substitute therefor --ASMT--.

Signed and Sealed this

First Day of March, 1994

Attest:

BRUCE LEHMAN

*Attesting Officer*   Commissioner of Patents and Trademarks